United States Patent [19]
Reeves

[11] Patent Number: 6,053,336
[45] Date of Patent: *Apr. 25, 2000

[54] WHEEL RETENTION DEVICE WITH EXTERNALLY ROTATABLE MULTI-FACETED RETENTION RING

[75] Inventor: Michael K. Reeves, Woodinville, Wash.

[73] Assignee: Sportworks Northwest, Inc., Woodinville, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/925,920

[22] Filed: Sep. 9, 1997

[51] Int. Cl.[7] .............................. A47F 7/04; A47F 7/00; E05B 73/00
[52] U.S. Cl. .............................. 211/20; 211/5; 211/17; 70/18; 70/234
[58] Field of Search .................................. 211/20, 5, 17, 211/22; 248/551; 70/234, 235, 48, 18

[56] References Cited

U.S. PATENT DOCUMENTS

| | | |
|---|---|---|
| 572,770 | 12/1896 | Putnam . |
| 589,643 | 9/1897 | De Mers . |
| 607,545 | 7/1898 | Martin . |
| 621,072 | 3/1899 | Gregory . |
| 631,665 | 8/1899 | Potter . |
| 639,517 | 12/1899 | Butcher . |
| 698,277 | 4/1902 | Hammond . |
| 977,228 | 11/1910 | Schestopol . |
| 1,353,541 | 9/1920 | Retterer . |
| 1,447,053 | 2/1923 | Trimm . |
| 3,815,721 | 6/1974 | Montoya et al. ........................ 194/283 |
| 3,834,196 | 9/1974 | Stone . |
| 4,269,049 | 5/1981 | Henderson . |
| 4,524,893 | 6/1985 | Cole ........................................ 224/319 |
| 5,197,310 | 3/1993 | Pedersen .................................. 70/227 |
| 5,278,538 | 1/1994 | Ainsworth et al. . |
| 5,802,889 | 9/1998 | Arnold ........................................ 70/18 |

*Primary Examiner*—Daniel P. Stodola
*Assistant Examiner*—Gregory J. Strimbu
*Attorney, Agent, or Firm*—Dellett and Walters

[57] ABSTRACT

A wheel retention device includes a base adapted for mounting to a vehicle transport rack and a retention ring secured to the base. The base includes an open cavity having a central axis, the open cavity is sized to receive a portion of a wheel of the wheeled vehicle therein. The retention ring is securely mounted on the base and is adapted to discretely rotate generally around the central axis of the base so as to enclose the cavity and secure the wheel therein thereby securing the wheeled vehicle to the rack. The retention ring is discretely rotatable about the base through the engagement of an outer generally polygonal surface of the base and inner generally polygonal surface of the retention ring.

15 Claims, 3 Drawing Sheets

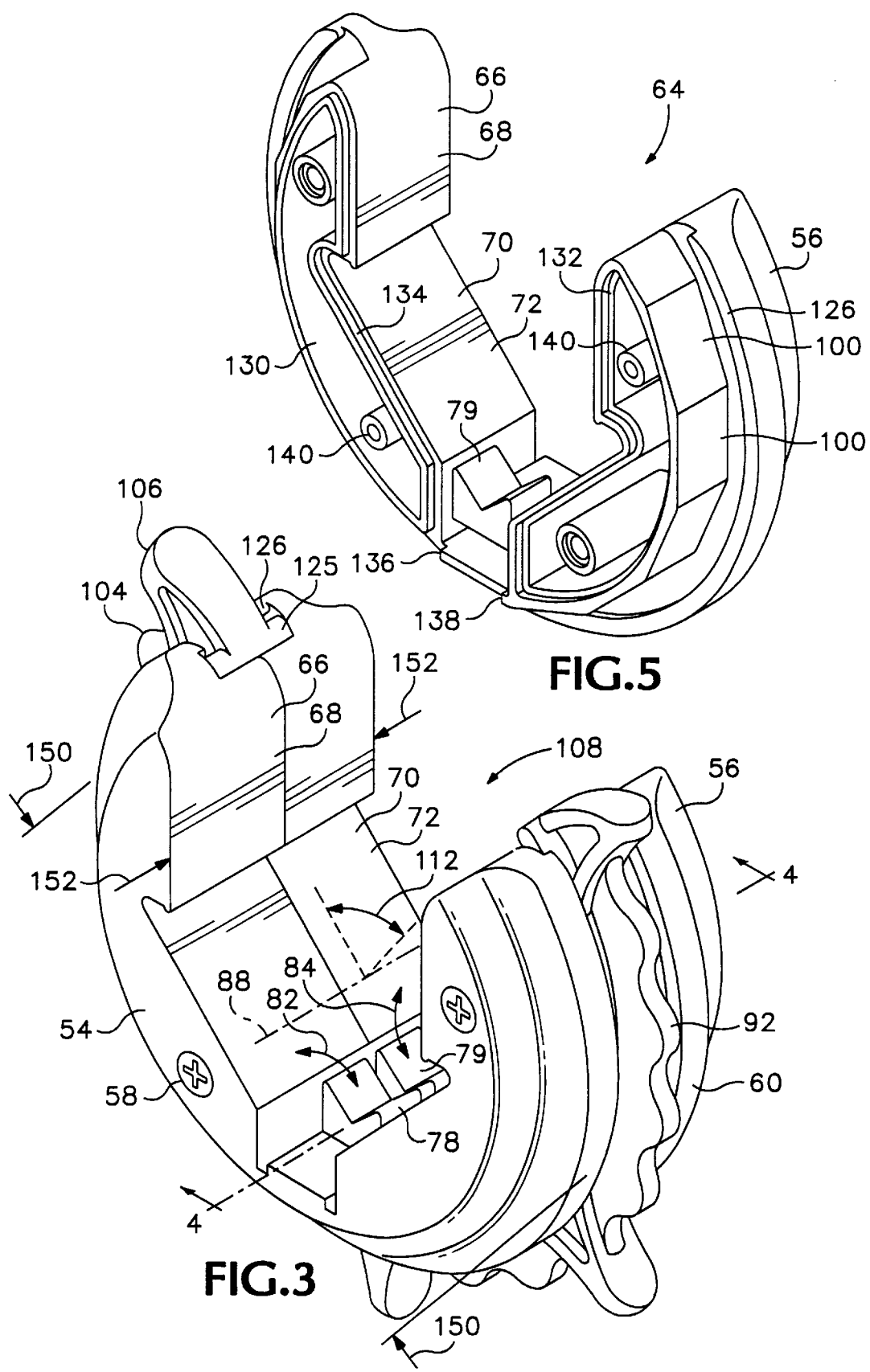

6,053,336

WHEEL RETENTION DEVICE WITH EXTERNALLY ROTATABLE MULTI-FACETED RETENTION RING

BACKGROUND OF THE INVENTION

This invention relates to a wheel retention device and, more particularly, to a wheel retention device that quickly and easily secures a wheeled vehicle to a vehicle rack for transport of the wheeled vehicle.

Conventional vehicle transport racks require a wheeled vehicle, such as a bicycle, a motorcycle or the like, to be secured to the rack by use of straps, stretchable cords, or pivotable members. Straps and stretchable cords may be unwieldy to use due to their length, may be easily deteriorated by environmental elements, may be lost if stored separately from the vehicle rack and may cause damage to the frame of the wheeled vehicle, such as by chipping the frame's paint. Pivotable members generally include metallic pivot pins which may become deteriorated by environmental elements, may break due to the large shear forces applied to the pins during use and may open during use thereby allowing the wheeled vehicle to fall from the rack during transport. Moreover, conventional pivotable members may not easily fit between the spokes of a wheel during positioning of the device thereby rendering the pivotal members difficult to use.

SUMMARY OF THE INVENTION

In accordance with the invention, a vehicle transport rack including a wheel retention device is provided wherein the wheel retention device includes a base adapted for mounting to a main support of the rack and a retention ring secured to the base. The base includes an open cavity having a central axis, the open cavity sized to receive a portion of a wheel of the wheeled vehicle therein. The retention ring is securely mounted on the base and is adapted to rotate generally around the central axis of the base so as to enclose the cavity and secure the wheel therein, thereby securing the wheeled vehicle to the rack.

Accordingly, it is an object of the present invention to provide a rack including an improved wheel retention device that facilitates quick and easy securing of a wheeled vehicle to the rack.

It is a further object of the present invention to provide a rack including an improved wheel retention device that is durable and that withstands harsh environmental conditions without deterioration.

It is yet another object of the present invention to provide a rack including an improved wheel retention device that is stored on the rack when not in use.

It is still another object of the present invention to provide a rack including an improved wheel retention device that contacts only a wheel of the wheeled vehicle during transport.

It is yet a further object of the present invention to provide a rack including an improved wheel retention device that remains closed during use and which is easily placed through the spokes of a wheel when positioning the device.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3 is a perspective view of the wheel retention device in an open configuration;

FIG. 5 is a perspective view of one section of the base of the wheel retention device.

DETAILED DESCRIPTION

Figure 1:
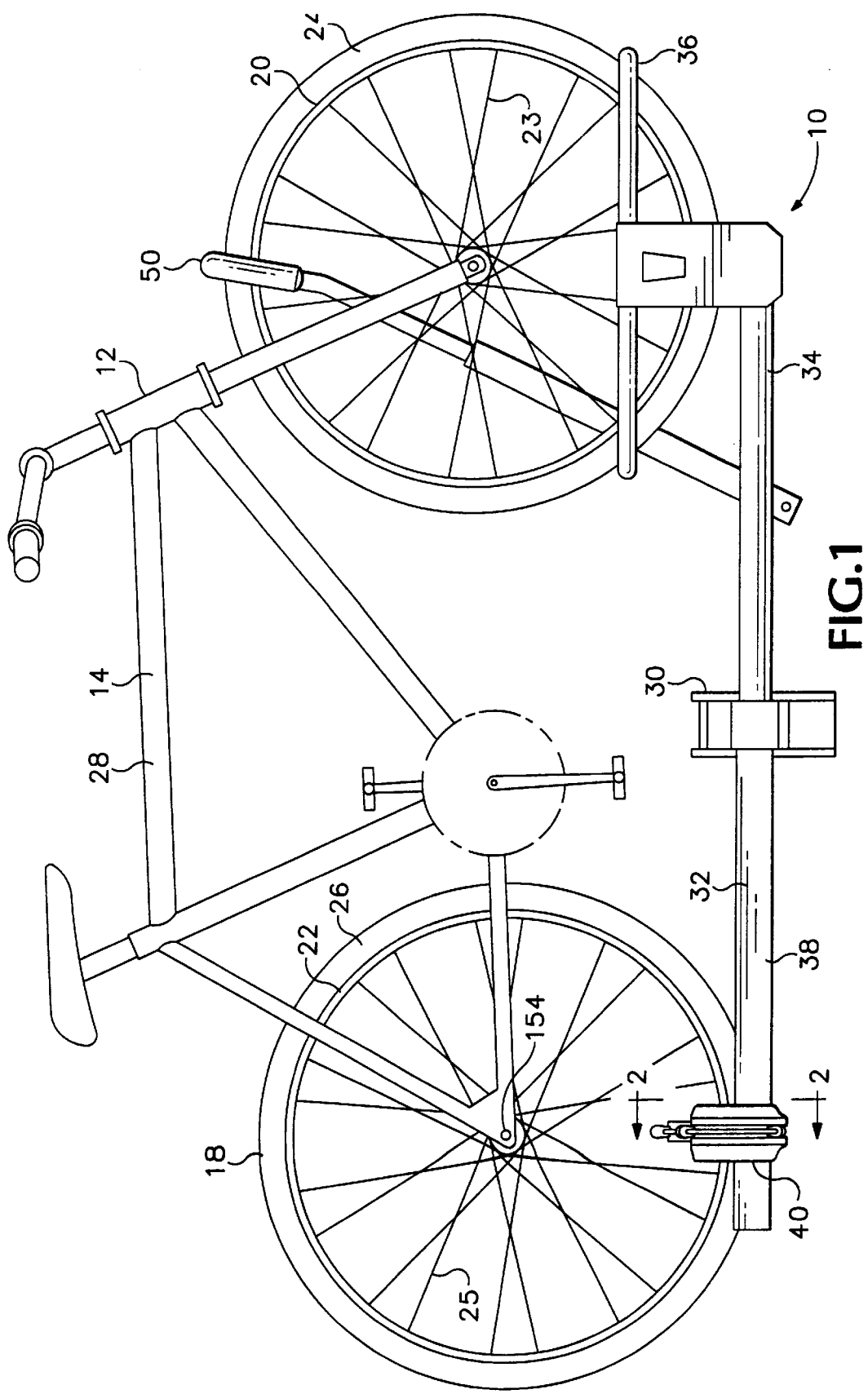
FIG. 1 is a side elevational view of a vehicle transport rack showing the rear wheel of a bicycle secured within a rear wheel well of a rack by the wheel retention device.

The system according to a preferred embodiment of the present invention comprises a base adapted for mounting to a vehicle transport rack and a retention ring rotatably secured to the base. Referring to FIG. 1, which is a side elevational view of a vehicle transport rack showing the rear wheel of a bicycle secured within a rear wheel well of a rack by the wheel retention device, a transport rack 10, such as a bicycle rack, is shown with a bicycle 12 secured therein. Bicycle 12 includes a frame 14, a front wheel 16 and a rear wheel 18, as is well known. Each of wheels 16 and 18 includes, respectively, metallic rims 20 and 22 including spokes 23 and 25 and wheel tires 24 and 26, usually made of rubber or the like. Frame 14 may be a man's bicycle frame including a crossbar 28 or a woman's bicycle frame that includes a downwardly sloping crossbar (not shown). For purposes of illustration, a bicycle is shown but those skilled in the art will understand that a variety of wheeled vehicles may be secured to a rack by the present invention.

Still referring to FIG. 1, rack 10 includes a mounting bracket 30 for securing the rack to a transport vehicle (not shown). In the preferred embodiment the transport vehicle is a passenger vehicle including a bumper having a hitch secured thereto and wherein the rack is releasably secured to the hitch. A main support 32 of the rack is generally centered on and secured to mounting bracket 30 and extends generally the length of a standard adult bicycle. Main support 32 includes a first end region 34 having a wheel well 36 secured thereto and a second end region 38 having a wheel retention device 40 movably secured thereto. Second end region 38 is recessed, or channel shaped, to receive a wheel of the bicycle and, therefore, may be referred to as a rear wheel well. During transport of a bicycle, front wheel 16 generally extends downwardly onto wheel well 36 and is secured against movement in all directions by an extensible arm 50. The extensible arm is pivotally secured to main support 32 and contacts the front wheel only on wheel tire 24. Those skilled in the art will understand that the bicycle may also be positioned with the rear wheel within wheel well 36 and the front wheel within second end region 38.

Figure 2:
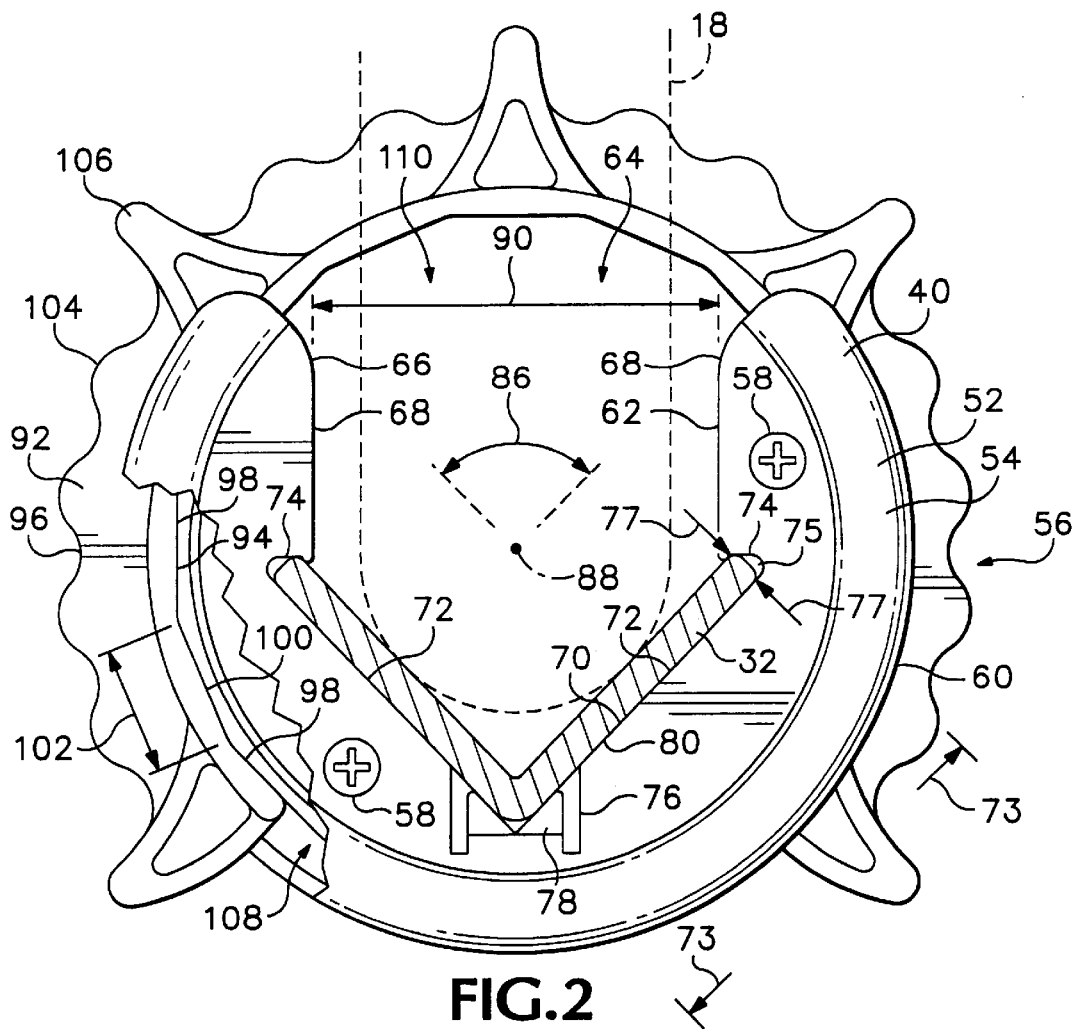
FIG. 2 is a partial cut-away cross sectional view of the wheel retention device in a closed configuration taken along line 2—2 of FIG. 1.

Referring to FIG. 2, which is a partial cut-away cross sectional view of the wheel retention device in a closed configuration taken along line 2—2 of FIG. 1, the wheel retention device will be described. Wheel retention device 40 includes a base 52 comprised of two mirror image sections 54 and 56 (only section 54 can be seen in FIG. 2) secured together by fasteners 58. Base 52 includes a generally circular outer surface 60 and an inner surface 62 that defines an open cavity 64 extending through the base. Outer surface 60 has a radius of approximately 2.25 in (5.6 cm). Inner surface 62 includes an upper section 66 having generally parallel side walls 68 and a lower section 70 having generally perpendicular lower walls 72 with a length 73 of approximately 2.0 in (5.0 cm). Lower walls 72 define a "V-shaped" cross section having shoulders 74, the "V-shaped" cross section mating with the "V-shaped" cross section of main support 32. Shoulders 74 define a recess 75 having a width 77 of approximately 0.125 in (0.31 cm). As will be understood by those skilled in the art, main support 32 and lower section 70 of the base may be of any cross sectional shape such that the base is frictionally secured to the main support by shoulders 74. Other cross sectional shapes may include a "U" shape and a square shape design. In other embodiments, the base may be secured to the main support by any means as known in the art.

Inner surface 62 of the base may also comprise a flexible friction device 76 including resilient tabs 78 and 79 (only tab 78 can be seen in FIG. 2). The tabs flex in the direction of arcs 82 and 84 (FIG. 3), respectively to frictionally engage an undersurface 80 of main support 32. The resilient tabs are nominally biased upwardly toward the open cavity thereby engaging the main support and preventing lateral movement of the wheel retention device along the main support. The frictional force exerted by tabs 78 and 79 and by shoulders 74 on main support 32 is easily overcome by manual movement of the base along the main support. Accordingly, the base is easily manipulated into position along the length of the main support so as to accommodate a variety of bicycle sizes. The frictional force exerted by tabs 78 and 79 and by shoulders 74 is sufficient, however, so as to secure the base in a stationary position on the main support during transport of a wheeled vehicle.

Still referring to FIG. 2, the structure surrounding and defining open cavity 64 defines approximately a ninety degree angle 86 with respect to a central axis 88 of the base. Moreover, open cavity 64 defines a width 90 of approximately 2.35 in (5.9 cm) which is sufficient to receive therein a portion of a bicycle wheel. As will be understood by those skilled in the art, rack 10 and wheel retention device 40 may be sized so as to receive therein the wheel of a motorcycle, an all-terrain vehicle, a passenger vehicle or any like wheeled vehicle.

Wheel retention device 40 further includes a retention ring 92 that defines a generally circular collar having an inner surface 94 and an outer surface 96. The radius of inner surface 94 with respect to axis 88 is approximately 2.0 in (5.0 cm). In the closed position, as shown in FIG. 2, the retention ring closes open cavity 64 of the base such that a tire secured within the open cavity is secured within the base. Inner surface 94 includes a plurality of chamfered, or beveled, surfaces 98 that nominally mate with chamfered surfaces 100 (FIG. 5) of base 52. Each of chamfered surfaces 98 and 100 has a length 102 of approximately 0.5 in (1.2 cm) and extend radially approximately 20° with respect to axis 88. Outer surface 96 preferably includes ribbed portions 104 and outwardly extending thumb grips 106 so as to facilitate manual rotational movement of the retention ring around base 52. Ring 92 also includes an opening 108 and an open interior region 110 that is coaxially aligned with axis 88 when the retention ring is mounted on the base.

The retention ring preferably is manufactured of a somewhat resilient material, such as engineered plastic, so that the ring may flex with respect to axis 88. Accordingly, the resiliency of the ring in combination with opening 108 facilitates chamfered surfaces 98 of the ring to move over chamfered surfaces 100 of the base when the ring is manually rotated about the base. The resiliency of the retention ring, together with the frictional force exerted by the ring on the base, however, secures the ring in a stationary position on the base in the absence of an external manual rotational force.

Referring to FIG. 3, which is a perspective view of the wheel retention device in an open configuration, the structure surrounding and defining opening 108 of retention ring 92 preferably defines a ninety degree angle 112 with respect to central axis 88 of the base, angle 112 being coextensive with angle 86 of the base when the ring is in an open position. In other words, outer surface 60 of the base as well as ring 92 each extend approximately 270° around axis 88 of the base. Accordingly, in the open position, when the opening of the ring is aligned with the open cavity of the base, a wheel may be placed within the open cavity of the base.

Figure 4:
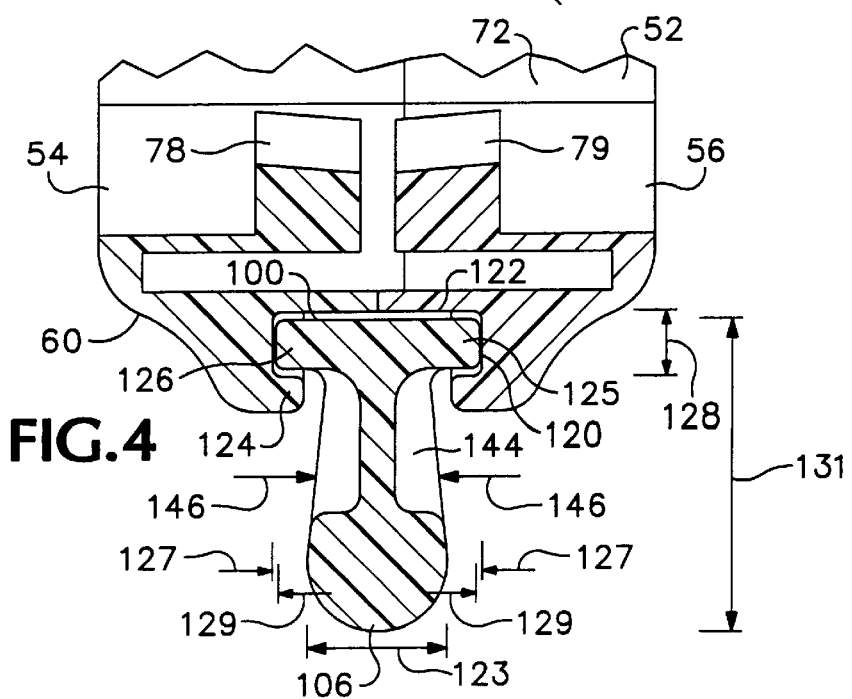
FIG. 4 is a cross sectional view of the wheel retention device taken along line 4—4 of FIG. 3.

Referring to FIG. 4, which is a cross sectional view of the wheel retention device taken along line 4—4 of FIG. 3, outer surface 60 of base 52 includes a groove 120 that defines a lower surface 122 comprised of chamfered surfaces 100 and inwardly extending portions 124 that define ring retention shoulders 126. Shoulders 126 are separated by a distance 123 of approximately 0.83 in (2.1 cm). Retention ring 92 includes a lower flange region 125 that is captured by shoulders 126 and an upwardly extending grip portion 144 having a width 146 which is approximately 0.38 in (0.95 cm), and that is unhindered by shoulders 126 of the base. The radius of the outer surface of flange region 125 with respect to axis 88 is approximately 2.25 in (5.6 cm). A width 127 of groove 120 is slightly larger than a width 129 of the lower flange region of the ring, which is approximately 0.75 in (1.9 cm), so that the ring is retained within the groove by shoulders 126. The height 131 of the retention ring is approximately 0.75 in (1.9 cm) as measured from the bottom surface of lower flange region 125 to the top of thumb grips 106. Accordingly, to assembly the wheel retention device, retention ring 92 should be placed between mirror image sections 54 and 56 of the base, and then the mirror image sections should be secured together with fasteners 58. Shoulders 126 preferably are spaced from lower surface 122 a distance 128 of approximately 0.3 in (0.75 cm) that is sufficient to allow flexing of the ring as it rotates around the base such that chamfered surfaces 98 of the ring are free to move over chamfered surfaces 100 of the base. Distance 128 is not sufficient, however, to allow the ring to be dislodged from the base when the retention device is in the assembled configuration. Accordingly, retention ring 92 is not easily removed from the base and the ring is usually stored on the base when the rack is not in use.

Referring to FIG. 5, which is a perspective view of one section of the base of the wheel retention device, one half of chamfered surfaces 100 and a single shoulder 126 of groove 120 are clearly shown. Each of sections 54 and 56 (only section 56 is shown in FIG. 5) include an internal region 130 that includes a female recessed ridge 132 and a male extending ridge 134 such that when sections 54 and 56 are placed facing one another, ridges 132 and 134 of the mirror image sections prevent rotation of the sections with respect to each another. Rotation between the two mirror image sections is further prevented by extending surfaces 136 and 138 and by fasteners 58 (FIG. 3) secured within receptacles 140. The use of mirror image sections facilitates ease of manufacturing and permits customers to easily disassemble and reassemble the retention device if desired.

Referring again to FIG. 3, in the preferred embodiment, base 52 has a width 150 of approximately 6 in (15 cm) and a thickness 152 of approximately 2.5 in (6.3 cm). The base and retention ring can be manufactured in any size, however, to accommodate wheels of varying sizes. The base preferably is manufactured of engineered plastic but may also be manufactured of any durable material such as metal or stiff rubber.

Referring again to FIGS. 1 and 2, the method of securing a wheeled vehicle to the rack will be described. The base is first secured on main support 32 of the rack by sliding the base on second end region 38 of the "V-shaped" channel. The retention ring is moved to the open position so that opening 108 is aligned with open cavity 64 of the base. The first wheel of the wheeled vehicle is then placed in wheel well 36 and the second wheel of the wheeled vehicle is placed in the "V-shaped" channel of main support 32. Extensible arm 50 is moved upwardly to secure the first wheel in wheel well 36. The base is then manually moved along the length of the main support until the base is positioned below the portion of the second wheel seated within main support 32. A sufficient force must be exerted on the base to overcome the frictional forces of shoulders 74 and tabs 78 and 79 of the base on the main support. The second wheel may then be slightly rotated about its axle 154 such that the retention ring may be rotated around the wheel rim without contacting the spokes of the wheel. The retention ring is then gripped by thumb grips 106 and rotated with respect to the base such that the ring encloses cavity 64, thereby securing the second wheel to the main support. As the retention ring is rotated, shoulders 74 and tabs 78 and 79 prevent rotational movement of the base with respect to the main support. A sufficient force must be exerted on the ring to overcome the frictional forces of chamfered surfaces 98 and the resiliency of the ring as it is moved over chamfered surfaces 100 of the base.

Accordingly, the wheel retention device of the present invention is easy to use, is not deteriorated by environmental conditions, is not easily lost and does not contact a frame of the wheeled vehicle. Moreover, the wheel retention device does not include pivot pins that may break during use, does not inadvertently move to an open position during transport of a wheeled vehicle, and does not contact spokes of the wheel during positioning of the retention ring.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A wheel retention device comprising:
   a base for mounting on a rack, said base including an open cavity which is sized to receive a portion of a wheel therein; and
   a retention ring mounted on said base, wherein said retention ring is rotatable generally around said base so as to block an opening in said base leading to said open cavity for securing the wheel relative to said base,
   wherein said base includes an outer generally polygonal surface comprising a plurality of facets and said retention ring includes an inner generally polygonal surface comprising a plurality of facets, said outer surface being in engagement with said inner surface to accurately and discretely position said retention ring with respect to said base.

2. A wheel retention device according to claim 1 wherein the portion of the wheel comprises a portion of a rim and a portion of a tire of a bicycle wheel.

3. A wheel retention device according to claim 1 wherein said retention ring is rotatable generally around said outer surface of said base.

4. A wheel retention device according to claim 3 wherein said retention ring extends circumferentially approximately 270 degrees around said outer surface of said base.

5. A wheel retention device according to claim 3 wherein said outer surface of said base comprises a bottom of a groove formed in said base, said retention ring being mounted within said groove.

6. A wheel retention device according to claim 5 wherein said facets define linear segments, wherein a first one of said linear segments of one of said base and said retention ring is at an angle of approximately 20 degrees relative to a second, adjacent one of said linear segments of said one of said base and said retention ring.

7. A wheel retention device according to claim 1 wherein said base includes a shoulder in the open cavity for mounting said base on the rack.

8. A rack for securing a wheeled vehicle therein, comprising:
   a first wheel well for receiving a first wheel of the wheeled vehicle therein;
   a second wheel well operatively connected to said first wheel well, said second wheel well comprising a channel; and
   a wheel retention device including a base which is mounted on said channel, said base including an open cavity wherein said open cavity is sized to receive a portion of a second wheel of the wheeled vehicle therein, a retention ring mounted on said base, said retention ring being rotatable generally around said base so as to block an opening in said base leading to said open cavity for securing the second wheel relative to said base and said second wheel well;
   wherein said base includes an outer generally polygonal surface comprising a plurality of facets and said retention ring includes an inner generally polygonal surface comprising a plurality of facets, said outer surface being in engagement with said inner surface to accurately and discretely position said retention ring with respect to said base.

9. A rack according to claim 8 wherein said outer surface of said base comprises a bottom of a groove formed in said base, said retention ring being mounted within said groove.

10. A rack according to claim 8 wherein said retention ring extends circumferentially approximately 270 degrees about a central axis of said base.

11. A rack according to claim 8 wherein said base includes a shoulder in the open cavity which facilitates the mounting of said base on said channel.

12. A method of securing a wheeled vehicle to a rack comprising the steps of:
   placing a first wheel of the wheeled vehicle in a first wheel well of the rack;
   mounting a wheel retention device to a second wheel well of the rack, the wheel retention device including a base having an open cavity and a retention member, said retention member being rotatable generally around said base so as to block an opening in said base, wherein said base includes an outer generally polygonal surface comprising a plurality of facets and said retention member includes an inner generally polygonal surface comprising a plurality of facets, said outer surface being in engagement with said inner surface to accurately and discretely position said retention member with respect to said base;
   placing a second wheel of the wheeled vehicle in the second wheel well of the rack and in the open cavity of the base; and
   rotating said retention member with respect to said base to block the opening in the base and retain the second wheel to said rack.

13. A method of securing a wheeled vehicle to a rack according to claim 12 wherein the base includes a periphery and a groove formed in said periphery, said retention member being mounted within said groove.

14. A method of securing a wheeled vehicle to a rack according to claim 13 wherein said groove includes said outer surface of said base.

15. A method of securing a wheeled vehicle to a rack according to claim 12 wherein said retention member extends circumferentially approximately 270 degrees about a central axis of said base.

* * * * *